United States Patent
Gonzalez Alemany et al.

(10) Patent No.: US 8,770,374 B2
(45) Date of Patent: Jul. 8, 2014

(54) BRAKING SYSTEM FOR ESCALATORS AND MOVING WALKWAYS

(71) Applicant: Thyssenkrupp Elevator Innovation Center, S.A., Gijon (ES)

(72) Inventors: Miguel Angel Gonzalez Alemany, Asturias (ES); Alberto Florez Castro, Asturias (ES); Jose Ojeda Arenas, Asturias (ES); Eva Rodriguez Rodriguez, Asturias (ES); Eduardo Moran Garcia, Asturias (ES); Jose Mendiolagoitia Juliana, Asturias (ES)

(73) Assignee: Thyssenkrupp Elevator Innovation Center, S.A., Gijon, Asturias (ES)

(*) Notice: Subject to any disclaimer, the term of this patent is extended or adjusted under 35 U.S.C. 154(b) by 1 day.

(21) Appl. No.: 13/712,573

(22) Filed: Dec. 12, 2012

(65) Prior Publication Data
US 2013/0153362 A1    Jun. 20, 2013

(30) Foreign Application Priority Data
Dec. 14, 2011   (ES) .................................. 201132009

(51) Int. Cl.
- *B65G 43/00* (2006.01)
- *B65G 23/26* (2006.01)
- *B66B 25/00* (2006.01)
- *B66B 29/00* (2006.01)

(52) U.S. Cl.
CPC .............. *B65G 43/00* (2013.01); *B65G 23/26* (2013.01); *B66B 25/00* (2013.01); *B66B 29/00* (2013.01)
USPC ......................................... 198/322; 198/323

(58) Field of Classification Search
CPC ........ B65G 23/26; B65G 43/00; B66B 25/00; B66B 29/00
USPC .................................................. 198/322, 323
See application file for complete search history.

(56) References Cited

U.S. PATENT DOCUMENTS

| | | | | |
|---|---|---|---|---|
| 3,830,344 A | * | 8/1974 | Cervenec et al. | 188/171 |
| 3,896,925 A | * | 7/1975 | Mitsui et al. | 198/323 |
| 4,875,558 A | * | 10/1989 | Berkhan et al. | 188/171 |
| 4,927,136 A | * | 5/1990 | Leask | 482/52 |
| 5,337,878 A | * | 8/1994 | Mehlert et al. | 198/323 |
| 6,805,224 B2 | * | 10/2004 | Lauch et al. | 188/1.11 E |
| 7,497,315 B2 | * | 3/2009 | Fargo et al. | 198/323 |
| 7,950,514 B1 | * | 5/2011 | Nurnberg et al. | 198/323 |
| 2010/0252377 A1 | * | 10/2010 | Lazar et al. | 188/74 |

FOREIGN PATENT DOCUMENTS
EP       0 388 299       9/1990

* cited by examiner

*Primary Examiner* — Leslie A Nicholson, III
(74) *Attorney, Agent, or Firm* — Merchant & Gould P.C.

(57) ABSTRACT

A braking system for escalators and moving walkways, includes a braking device (3) with a main brake (30) of the type which is released when there is no voltage in its electric activator, and an auxiliary brake (31) of the type which is closed when there is no voltage in its electric activator. A controller (1) controls the braking device (3), prepared for obtaining the load of the escalator or moving walkway, and calculates the braking torque required for each braking device (3) depending on the load and activating the braking device (3) for obtaining the corresponding torque while braking when a braking command is received. The auxiliary brake is activated (32) for taking the escalators or moving walkway to a safe position when there is a system failure.

12 Claims, 1 Drawing Sheet

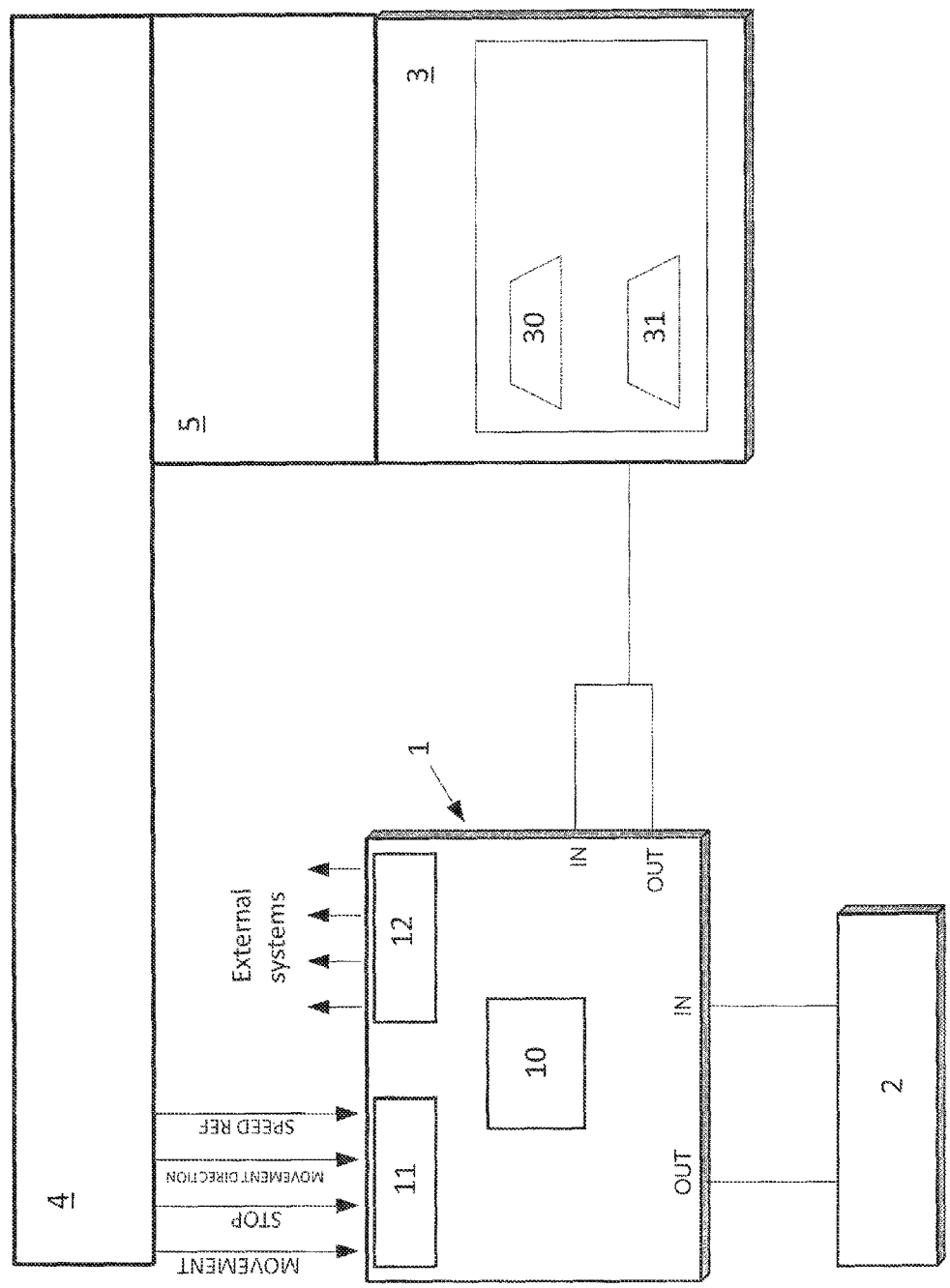

BRAKING SYSTEM FOR ESCALATORS AND MOVING WALKWAYS

This application claims benefit of Serial No. 201132009, filed 14 Dec. 2011 in Spain and which application is incorporated herein by reference. To the extent appropriate, a claim of priority is made to the above disclosed application.

FIELD OF THE INVENTION

The present invention relates to a braking system for moving walkways or escalators, and more specifically for moving walkways or escalators used for the transport of people and goods and which are formed by an endless belt of pallets or steps moving on side guides.

Conventional moving walkways and escalators for the indicated purpose are made up of an assembly of pallets or steps moving on guides, which are secured and fitted on a structure which supports the weight of the components and users. Walkways and escalators are further provided with a glass or opaque balustrade also secured to the same bearing structure and on which a handrail moves at the same speed as the pallets or steps.

BACKGROUND OF THE INVENTION

Conventional systems for transporting passengers/goods, such as moving walkways or escalators, include a chain of conveyor pallets or steps which move in a circuit for the purpose of providing continuous movement along a specific path. The conveyor pallets or steps are connected to said chain circuit, which moves as a result of a drive system. The drive system usually consists of a chain of conveyor plates, gear wheels, a shaft and an electric geared motor provided with an emergency brake. The electric motor drives the shaft to which the gear wheels are integrally attached, which gear wheels transmit the movement to the links of the chain of conveyor pallets or steps. The conveyor pallets or steps move in the same way as said chain does. The drive system is located at only one of the ends of the moving walkway or escalator while the elements responsible for providing the tensing of the system are usually located at the opposite end. The conveyor pallets or steps travelling along the bottom part of the moving walkway or escalator in its entirety following the return path turn over at these end areas of the moving walkway or escalator.

For assuring the system safety in the event of system failures and keeping the belt of pallets or steps immobile in the stopped state, even without current electric, it is necessary to provide the system with a braking system assuring this. Said braking system has to be in a braking situation even without electric voltage being applied.

It is also necessary for said braking system to be able to stop the movement of the belt of pallets or steps with the machine under any load state at a distance such that it assures the smallest braking distance which does not endanger passenger safety.

The braking system traditionally consists of brake shoes which are pushed by means of springs against the side of a drum or flywheel integrally attached to the shaft of the geared motor when braking. To open the brake and allow the normal operation of the machine one or several linear solenoids are arranged, acting in the direction opposite to the spring or springs, such that when they are energized they are able to move the shoes from the surface of the drum or flywheel, allowing the free rotation of the system.

Over the years different mechanical schemes have been proposed to improve the efficacy of this system, such as that described in patent EP0388299-B1 of Otis Elevator, for example, although its operating principle is similar to that described above.

All these spring-guided emergency braking systems require using a flywheel to enable maintaining safe braking distances given different load states of the system, particularly both in the case of an unloaded and a fully loaded machine in an upward direction in the case of an escalator.

It is further necessary to adjust the braking force by means of pre-loading the springs which "close" the shoes because the deceleration obtained depends on them. These adjustments will have to be repeated every so often because both the springs and the shoe friction elements experience wear affecting their braking ability.

All this has lead to the development of different braking systems which can obtain pre-programmed decelerations regardless of the weight of the passengers on the machine and the rotating direction at the time of braking in a safe manner.

One of the solutions used consists of providing a conventional brake, the shoes of which are forced by springs into the de-energized position of the coil (the coils have no electric power supply, i.e., without energy because their power supply has been interrupted by the system by means of a "short-circuiting" device such as a contactor or relay) with a control system which acts on the solenoids while braking such that these generate a force against the springs such that the braking torque is reduced for adapting it to the load state of the escalator or walkway at that time, achieving the required braking distance. The problem of this system is that in the event of a failure, the system brakes with all the braking force available, whereby it is not possible to comply with the braking distances required by law depending on the load state.

Other braking systems are based on using a variable frequency drive powering the motor to perform the braking ramp and thus achieve a controlled deceleration. The drawbacks of this solution include the increase in cost for having to use this variable frequency drive because it is an optional element not incorporated in all machines. It is also necessary to recalculate the power of this variable drive to enable handling the worst system load conditions, which results in an increase in cost and of the necessary space with respect to a solution in which the variable drive is not used while braking. Furthermore, the use of the variable drive does not eliminate the need to have a conventional emergency brake.

SUMMARY OF THE INVENTION

The present invention relates to a braking system for moving walkways or escalators assuring a constant braking distance regardless of the system load.

This system includes the braking device as well as the logic to be used by its controller.

The braking device uses two brakes: a main or service brake, which does not generate a braking force when there is no voltage in its solenoids because the springs tend to "open" the brake, and another auxiliary, secondary or emergency brake of the type which is stopped when there is no voltage on its solenoids.

The braking torque of the service brake would be controlled dynamically by means of regulating the force of its solenoids and would only be used during the process braking. Therefore, the secondary brake is what would keep the machine immobilized when stopped.

Another element of the braking system is the system controller, which is responsible for controlling the activation and deactivation of the brakes, as well as regulating the braking torque depending on the load. This load can be calculated by same based on data from sensors connected to it or from an external system, such as a variable frequency drive.

In machines where there is more than one brake, there can be either a control system that is able to control several braking units or several control systems communicated to one another for coordinating their control actions on their assigned brakes, such that a constant braking distance is assured independent of the load without generating damaging overstraining on the mechanical components of the machine.

The braking system for escalators and moving walkways comprises:

at least one braking device, each with a main brake of the type which is released when there is no voltage in its electric activation means, and an auxiliary brake of the type which is closed when there is no voltage in its electric activation means;

control means for controlling the at least one braking device, configured for:

obtaining the load of the escalator or moving walkway, calculating the braking torque required for each braking device depending on said load and activating the at least one braking device for obtaining the corresponding torque while braking when a braking command is received;

activating the at least one auxiliary brake for taking the escalators or moving walkway to a safe position when there is a system failure (an internal failure which the braking system itself detects by means of self-testing).

For applying the braking torque, the control means are preferably configured for calculating the braking current which has to be supplied to electric activation means of the main brake and applying said current while braking.

The control means can comprise a power controller configured for keeping the braking current constant.

The control means are preferably configured for activating either the main brake alone or the main brake (30) together with the secondary brake, depending on the value of the calculated braking torque.

The control means can be also configured for:

obtaining the actual deceleration of the escalator or moving walkway caused by activating the braking device;

comparing the actual deceleration with the theoretical deceleration obtained according to the calculated braking torque, such that if the difference between both exceeds a pre-established limit the control means consider the existence of a system failure.

The electric activation means of the main brake and of the auxiliary brake preferably comprise at least one solenoid.

The control means are preferably configured for obtaining the load of the escalator or moving walkway according to at least any one of the following manners:

based on data from sensors connected to the control means;

from the information supplied by an external system, such as an input signal;

through the information supplied by load estimation means responsible for estimating the load.

through estimating the torque from torque-voltage or torque-current transducers coupled to the output shafts of the geared motor assembly of the escalator or moving walkway;

through a power estimator from calculating the speed by means of an encoder and the current and voltage supplied to the motor or motors at each instant in time.

The system can comprise load estimation means responsible for estimating the load of the escalator or moving walkway.

In the event that the escalator or moving walkway has a plurality of electric geared motors, the control means can comprise one control device for each braking device coupled to each geared motor, the different control devices being interconnected to one another for distributing the braking torques such that safe braking with no overstraining on the mechanical components is assured.

The system can have an uninterrupted power supply system for assuring the correct operation of the system even in the event of a power grid failure.

The control means can have a learning algorithm to compensate for the loss of brake effectiveness with use such that the braking distance always remains constant, for which purpose the control means are configured for:

analyzing the distance values obtained in each braking;

if it is greater than that assigned, increasing the next braking by a braking force value in a manner that is proportional to the effectiveness lost in the preceding brakings.

The control means are preferably based on a redundant CPU scheme which is safe in the event of failures of any internal element of the actual control means.

BRIEF DESCRIPTION OF THE DRAWINGS

A series of drawings which aid in better understanding the invention and which expressly relate to an embodiment of said invention presented as a non-limiting example thereof is very briefly described below.

FIG. 1 shows a block diagram of the system object of the invention.

DETAILED DESCRIPTION OF THE PREFERRED EMBODIMENTS

The main blocks of the braking system object of the invention as can be seen in FIG. 1 are control means 1 and a braking device 3 comprising both brakes: the main brake 30 and the auxiliary brake 31. The control means 1, usually a control device, can optionally comprise load estimation means 2, although the load estimation information with respect to the escalator or walkway 4 could be supplied to the control means 1 through an estimator external to the system.

Although the main brake 30 and auxiliary brake 31 can usually be separate mechanical elements, it could be possible to manufacture a brake unit integrating both functionalities.

The control means 1 are responsible for commanding the brakes (30,31) and controlling their state.

In the stopped state the control means 1 withdraw voltage from both brakes (30,31) and make certain that the auxiliary brake 31 is in the braking position.

In the event of a movement command, the control means 1 open both brakes (30,31) allowing the free movement of the motor or motors and make certain that they remain in the open state, switching to fault mode in the event of detecting an incorrect position of one of the brakes.

As soon as it receives the braking command, the control means calculate the braking torque necessary in accordance with the system load and command the brakes to obtain this torque while braking, withdrawing voltage from both once the stopped state is reached. The load of the escalator can be calculated by methods already used in other applications, such as for example the torque signal applied by the motor coming from a variable drive, or it can be calculated through estimating the torque from torque-voltage or torque-current transducers coupled to the output shafts of the geared motor assembly 5. Another way to estimate the load is through a power estimator from calculating the speed by means of an encoder and the current and voltage supplied to the motor or motors 5 at each instant in time. This system would have a table where a specific torque is corresponded to each type of motor for each voltage, current and speed.

Throughout braking, the control means have to check what the actual deceleration obtained is, to that end it must be provided with information on speed either directly in a numerical value from another higher control system or it must be provided with an algorithm for calculating such speed from the input signal or signals provided by encoder-type sensors or sensors of another type from which the speed and rotation direction can be determined.

If the difference between the commanded deceleration and the obtained deceleration is greater than a pre-established limit, the braking system has to switch to fault mode.

For the purpose of controlling the torque exerted by the main brake 30 the control means 1 have to calculate the current which has to be supplied to the solenoid of this brake, which is proportional to the exerted braking torque, depending on the system load and to keep this current constant while braking. To keep this current constant, the control means are provided with a power controller which can act in different ways on the solenoid to supply it the assigned current, for example it can perform pulse width modulation (PWM) regulation to keep a specific voltage taking the current through the solenoid to reach the required value.

To determine the load on the escalator or walkway 4, either the signal from an external system, such as a variable frequency drive reporting the torque required to move the system can be used, or the actual control means can have access to the load estimation means 2, usually a module, which estimate this load from the values of different sensors, such as voltage, current and position and speed of the motor/motors, for example. The actual load estimation means 2 can be part of the control means 1 or can be an external module that is directly communicated with them.

The control means 1 comprise data processing means 10 (e.g., a microprocessor or a microcontroller), an input module 11 for receiving different input signals, such as the movement or start signal, stop signal, movement direction signal and a speed reference signal. They can also comprise an output module 12 for sending different output signals to external systems. The control system can be a system based on a redundant CPU scheme such that it is safe in the event of failures of the actual system. In other words, in the event of the failure of one of its elements, for example the CPU, the other CPU withdraws power from both brakes and takes the system to a safe position. This is possible because at least one of the CPUs verifies system operation (system responses, i.e., outputs such as activated signals, voltages and currents applied to the coils of brakes, etc., in the event of external stimuli, i.e., a stop signal, a movement direction signal, load of the escalator or walkway 4, etc., even internal stimuli, i.e., CPU failure, etc.).

The control means will modify the braking torque of the main brake by means of controlling the force exerted by its solenoid/solenoids controlling the current supplied to it, control of the auxiliary brake being all or nothing. In the instant they receive the braking command, the control means calculate the current value to be supplied to the main brake and keep it constant throughout the entire braking process.

The control means use the main brake alone or also the secondary brake while braking depending on the braking torque required. The activation or non-activation of the auxiliary brake will be determined by the system load level. If the braking torque required is greater than the sum of the minimum possible torque in the main brake plus that of the auxiliary brake, both are activated. In any case, the strategy of using both brakes or not, depending on the load, and using only the main brake for usual brakings, can be used. Therefore, both the size of both brakes and the size of the flywheel required for keeping the braking distances at values required by the laws in force can be optimized with this strategy.

The invention claimed is:

1. A braking system for escalators and moving walkways, comprising:
at least one braking device, each braking device having a main brake which is released when there is no voltage in an electric activator, and an auxiliary brake which is closed when there is no voltage in the electric activator;
a controller for controlling the at least one braking device, configured for:
obtaining a load of the escalator or moving walkway, calculating braking torque required for each braking device depending on said load and activating the at least one braking device for obtaining corresponding torque while braking when a braking command is received;
activating the at least one auxiliary brake for taking the escalator or moving walkway to a safe position when system failure occurs.

2. The system according to claim 1, wherein for applying the braking torque the controller is configured for calculating the braking current which has to be supplied to electric activator of the main brake and applying said current while braking.

3. The system according to claim 2, wherein the controller comprises a power controller configured for keeping the braking current constant.

4. The system according to claim 1, wherein the controller is configured for activating either the main brake alone or the main brake together with the auxillary brake, depending on the value of the calculated braking torque.

5. The system according to claim 1, wherein the controller is configured for:
obtaining actual deceleration of the escalator or moving walkway caused by activating the braking device;
comparing the actual deceleration with theoretical deceleration obtained according to the calculated braking torque, such that if the difference between the actual deceleration and the theoretical deceleration exceeds a pre-established limit, the controller considers the existence of a system failure.

6. The system according to claim 1, wherein the electric activator of the main brake and of the auxiliary brake comprise at least one solenoid.

7. The system according to claim 1, wherein the controller is configured for obtaining the load of the escalator or moving walkway according to at least any one of the following:
based on data from sensors connected to the controller;
from information supplied by an input signal;
through information supplied by a load estimator responsible for estimating the load;
through estimating torque from torque-voltage or torque-current transducers coupled to output shafts of a geared motor assembly of the escalator or moving walkway;
through a power estimator from calculating a speed by an encoder and current and voltage supplied to the motor or motors at each instant in time.

8. The system according to claim 1, further comprising a load estimator responsible for estimating the load of the escalator or moving walkway.

9. The system according to claim 1, where the escalator or moving walkway has a plurality of electric geared motors, wherein the controller comprises one control devices for each braking device coupled to each geared motor, the different control devices being interconnected to one another for distributing the braking torques such that safe braking with no overstraining on the mechanical components is assured.

10. The system according to claim 1, comprising an uninterrupted power supply system for assuring correct operation of the system even in the event of a power grid failure.

11. The system according to claim 1, wherein the controller has a learning algorithm to compensate for loss of brake effectiveness with use such that the braking distance always remains constant, for which purpose the controller is configured for:
   analyzing distance values obtained in each braking;
   if the braking distance is greater than an assigned distance, increasing the next braking by a braking force value in a manner that is proportional to effectiveness lost in preceding brakings.

12. The system according to claim 1, wherein the controller is based on a redundant CPU scheme which is safe in the event of failures of an internal element of the controller.

\* \* \* \* \*